(12) United States Patent
Scheerer

(10) Patent No.: US 10,955,032 B2
(45) Date of Patent: Mar. 23, 2021

(54) SWITCHING MODULE

(71) Applicant: Voith Patent GmbH, Heidenheim (DE)

(72) Inventor: Jörg Scheerer, Herbrechtingen (DE)

(73) Assignee: Voith Patent GmbH, Heidenheim (DE)

( * ) Notice: Subject to any disclaimer, the term of this patent is extended or adjusted under 35 U.S.C. 154(b) by 196 days.

(21) Appl. No.: 16/172,068

(22) Filed: Oct. 26, 2018

(65) Prior Publication Data

US 2019/0063561 A1   Feb. 28, 2019

Related U.S. Application Data

(63) Continuation of application No. PCT/EP2017/058324, filed on Apr. 7, 2017.

(30) Foreign Application Priority Data

Apr. 28, 2016  (DE) .................... 10 2016 207 262 .5

(51) Int. Cl.
*F16D 11/14*   (2006.01)
*F16H 3/78*    (2006.01)
(Continued)

(52) U.S. Cl.
CPC .............. *F16H 3/78* (2013.01); *F16D 11/14* (2013.01); *F16D 23/025* (2013.01); *F16D 23/04* (2013.01);
(Continued)

(58) Field of Classification Search
None
See application file for complete search history.

(56) References Cited

U.S. PATENT DOCUMENTS 4,569,252 A * 2/1986 Harper .................... F16H 3/78
                                                         475/299
4,976,671 A * 12/1990 Andersson ............... F16H 3/54
                                                         475/299

(Continued)

FOREIGN PATENT DOCUMENTS

DE    2 021 543       11/1971
DE    41 12 330 A1    7/1992
(Continued)

OTHER PUBLICATIONS

Notice of Transmission of the International Research Report and the Written Notice Issued the International Searching Authority or Declaration dated Jun. 6, 2017 for International Application No. PCT/EP2017/058324 (13 pages).

(Continued)

*Primary Examiner* — Justin Holmes
(74) *Attorney, Agent, or Firm* — Taylor IP, P.C.

(57) ABSTRACT

The invention relates to a switching module for coupling a drive module to an output module in an automatic transmission where the drive module and the output module are rotatably mounted around a common transmission axis. The switching module includes a switching unit rotatably mounted about the common transmission axis and couples with one of the modules in a movable and rotationally fixed manner. The switching unit includes an element for coupling the drive module and the output module in a force-fitting manner and a power transfer element for coupling the drive module and the output module in a form-fitting manner.

15 Claims, 2 Drawing Sheets

(51) Int. Cl.
*F16D 23/04* (2006.01)
*F16H 63/04* (2006.01)
*F16D 23/02* (2006.01)
*F16H 63/30* (2006.01)
*F16D 11/00* (2006.01)

(52) U.S. Cl.
CPC ......... *F16H 63/04* (2013.01); *F16H 63/3023* (2013.01); *F16D 2011/002* (2013.01); *F16H 2200/2064* (2013.01)

(56) References Cited

U.S. PATENT DOCUMENTS

| | | | |
|---|---|---|---|
| 5,390,347 A | 2/1995 | Buri et al. | |
| 5,711,740 A * | 1/1998 | Bakowski | B60K 17/344 |
| | | | 180/247 |
| 6,669,596 B1 * | 12/2003 | Sefcik | F16H 3/663 |
| | | | 475/278 |

FOREIGN PATENT DOCUMENTS

| | | | |
|---|---|---|---|
| DE | 102 03 488 A1 | 7/2003 | |
| DE | 10 2008 010 064 A1 | 8/2009 | |
| DE | 10 2011 084 257 B3 | 1/2013 | |
| EP | 2 162 643 B1 | 3/2012 | |
| FR | 2 830 301 A1 | 4/2003 | |
| GB | 1144752 A * | 3/1969 | ............... F16H 3/78 |
| WO | WO-02066850 A1 * | 8/2002 | ............. F16D 23/06 |

OTHER PUBLICATIONS

German Office Action dated Jan. 11, 2017 for German Application No. 10 2016 207 2625 (6 pages).

* cited by examiner

SWITCHING MODULE

CROSS REFERENCE TO RELATED APPLICATIONS

This is a continuation of PCT application No. PCT/2017/058324, entitled "SWITCHING MODULE", filed Apr. 7, 2017, which is incorporated herein by reference.

BACKGROUND OF THE INVENTION

1. Field of the Invention

The invention relates to a switching module for coupling a drive module to an output module. A switching module of this type can be installed in an automatic transmission for a motor vehicle for example to shift from one gear into another gear.

2. Description of the Related Art

Generic automatic transmissions are generally known. As an example, we refer to DE 20 21 543 A1 which describes a combined hydrodynamic-mechanical transmission for vehicles, dividing the traction power with a differential gear into one power path having a hydrodynamic converter and a mechanical power path and with merging of the traction power into a common power path. The transmission therein has mechanical, selectively activating or deactivating transmission ratios (gears) in the hydrodynamic and/or mechanical and/or merged power path.

Normally in all automatic transmissions, i.e. differential torque converter transmissions (DIWA), several planetary gear sets are used. These planetary gear sets are connected with one another in a predetermined fixed coupling pattern. With multi-disk clutches or multi-disk brakes the various ratios of the transmission are then realized. By respective shifting of the disks of clutches or brakes a gear change is typically achieved without an interruption in the pulling force.

The known multifold advantages of automatic transmissions are countered by the disadvantages of the high component cost of planetary gear sets and multi-disk clutches and brakes.

For elimination of this disadvantage, a coupling pattern is described in EP2 162 643 A1 which includes exactly one planetary gear set behind the converter, where between the drive side, or respectively the last planetary gear set and the output side or respectively the output shaft, a claw coupling is arranged, which can also be referred to as a switching unit, where the switching unit represents a part of a switching module that is not disclosed in any detail. Synchronization and operating the claw coupling are also allocated to this switching module.

An additional switching module with coupling is disclosed in DE 41 12 330 A1.

What is need in the art is a switching module that has been optimized to make possible a space saving and cost effective installation of the switching module between a drive module and an output module in an automatic transmission for a motor vehicle.

SUMMARY OF THE INVENTION

The present invention provides a switching module for coupling a drive module to an output module in an automatic transmission for a motor vehicle, where the drive module and the output module are rotatably mounted around a common transmission axis A. The switching module herein includes a switching unit which can also be rotated about the transmission axis A and may be coupled with one of the modules in a movable and rotationally fixed manner, where the switching unit includes an element for coupling the drive module and the output module in a force-fitting manner and a power transmission element for coupling the drive module and the output module in a form-fitting manner.

The switching module according to the invention is moreover designed so that the power transmission element for the form-fitting coupling relative to the transmission axis A, viewed in radial direction, is arranged outside of the element for the force-fitting coupling.

This basic arrangement of force-fitted and form-fitted coupling allows an especially compact design of the switching module in the transmission housing. Transmission axis A, viewed in radial direction, is to be understood that the form-fitted and friction-coupling are arranged on two different diameters in regard to transmission axis A.

An exemplary embodiment provides that the switching unit is coupled with the drive module in a rotationally fixed manner.

The power transfer element can moreover be designed to be ring shaped, where the element has inside teeth and is coupled in a rotationally fixed manner with the output module via a slide connection arranged on the outside diameter. It can moreover be provided that the additional element is a synchronizer ring that includes at least two friction surfaces.

In another exemplary embodiment, the drive module can include a planetary gear set. The ring gear of the planetary gear set can be coupled with a first coupling part having a first counter friction surface and the planetary carrier of the planetary gear set can be coupled with a second coupling part having a second counter friction surface. The planetary gear set can be shifted via a brake in such a manner that the coupling parts and thus also the friction surfaces can cover different drive speed ranges.

The coupling components can moreover be designed in such a manner that they always have external teeth on the outside circumference which through axial movement of the switching unit, mesh with the internal teeth on the power transmission element.

In an exemplary embodiment, the coupling components can have ring shaped regions, where counter friction surfaces are arranged alternatively on the inside or outside ring surfaces. Depending on the design, the synchronizer ring can be arranged either radially internally or externally of the ring-shaped regions.

The coupling between the slide connection and the synchronizer ring can be designed as known from the current state of the art. Depending on the arrangement of the counter friction surfaces, the friction surfaces must be arranged on the synchronization ring accordingly internally or externally, so that the friction surfaces can engage on movement of the slide connection. The basic sequence of the synchronization is the same for both arrangement variants and is generally known from the current state of the art. The friction surfaces are arranged in such a manner that during movement the friction between the friction surfaces constantly increases so that speed differences between drive side and output side are compensated for.

The switching unit can be moved into at least three positions, so that at least the following connections are switchable: one rotationally fixed connection between the ring gear and output module, one rotationally fixed connection between the planetary carrier and output module or a neutral position in which essentially no torque transfer occurs between drive side and output side. In the last case, in the neutral position, very low torque values can be transmitted via the synchronizer rings.

The axial movement of the switching unit can be implemented with an actuation device. The actuation device can be operated by an activation element. The actuation element can for example be a pneumatic or hydraulic cylinder or an electrical switching element. Depending on spatial conditions, different arrangements and/or slide mechanisms can be used.

In one exemplary embodiment the output module includes a drive shaft, where the slide connection is arranged on the drive shaft. In this exemplary embodiment, all components of the switching unit can be accommodated inside the bell-like design of the drive shaft and the activation device can be arranged outside the bell, where the connecting element of switching unit and actuation device is routed around the bell.

In another exemplary embodiment, the drive shaft in the region of the slide connection can have at least one opening that is designed in such a way that the switching unit is movable over the opening in the drive shaft along the slide connection by an actuation device.

In another exemplary embodiment, an automatic transmission includes a drive module and an output module which are mounted in a rotatable manner about a common transmission axis A and a switching module, designed according to the preceding description. The drive module moreover includes a planetary gear set so that the coupling is selectively switchable via the switching module between ring gear and output module, between planetary carrier and output module or a neutral position.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
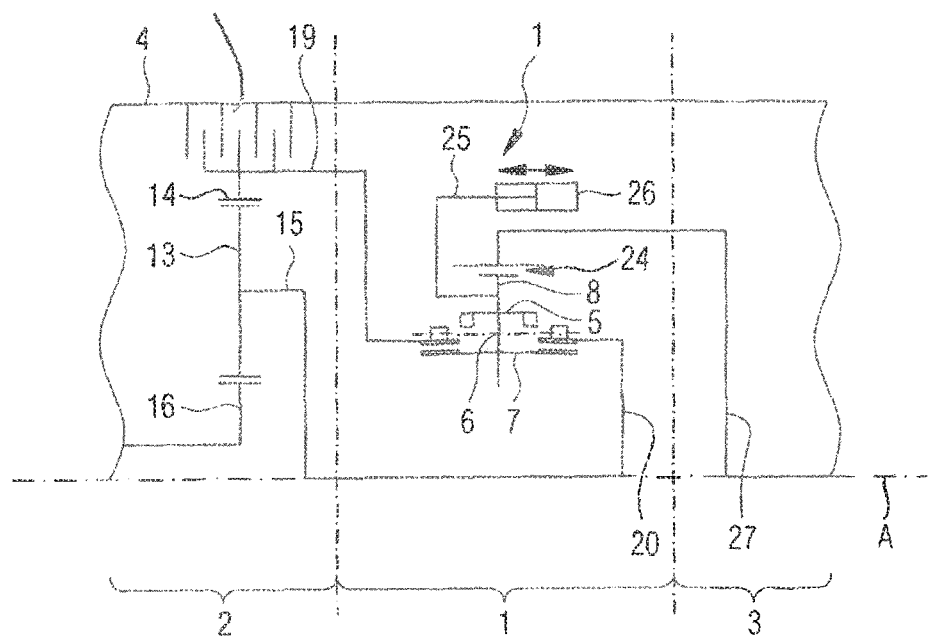
FIG. 1 shows an embodiment of a switching module between drive module and output module.

Referring now to the drawings, and more particularly to FIG. 1 a sketch is shown which clarifies the arrangement of switching module 1 between drive module 2 and output module 3. The illustration includes only the parts that are essential for the invention. Components not essential to the invention of an automatic transmission, for example the inbox with planetary gear sets, brakes and couplings are omitted. In the illustrated design, modules 1, 2, 3 are accommodated in the transmission housing rotationally symmetrically about transmission axis A, where the individual module sections can also be installed in the transmission housing nested into one another.

Using a switching module, output shaft 27 of output side 3 can be coupled with drive side 2 in such a manner that different gear ratios can be switched. Depending on switching of disc brake 29, coupling parts 19, 20 which are connected with planetary gears 13 are driven at different speeds.

Switching module 1 is arranged between coupling parts 19, 20 and output shaft 27. The switching module 1 includes a switching unit 5 which can be moved into three positions with an actuating device 25, where the movement occurs along a slide connection 24. FIG. 1 illustrates switching unit 5 in the neutral position. In this position no torque transmission occurs between drive side 2 and output side 3.

On actuation of switching module 1, switching unit 5 is moved into one of the two other shifting positions. Thus, one of the following connections can selectively be switched: a rotationally fixed connection between ring gear 14 and output group 3 and a rotationally fixed connection between planetary carrier 13 and output module 3.

Switching unit 5 substantially consists of a synchronization unit with a synchronizer ring 7, and the power transfer element 8 which is connected via slide 6. Slide 6 is connected with actuating device 25 and applies a shifting force.

During the shifting process, the switching unit is moved along slide connection 24 so that the friction surfaces 10a, b, 11 and 12 of synchronizer ring 7 and coupling components 19, 20 are being engaged. During the movement, the frictional force between friction surfaces 10a, 10b, 11 and 12 increases, so that speeds of drive side and output side can be equalized. If the speed difference is small enough, an additional movement can occur, whereby power transfer element 8 is moved onto one of the coupling components 19, 20, so that the inside teeth of the power transfer element 8 and outside teeth 21a or 21b mesh and thus a form fitting connection occurs.

Figure 2:
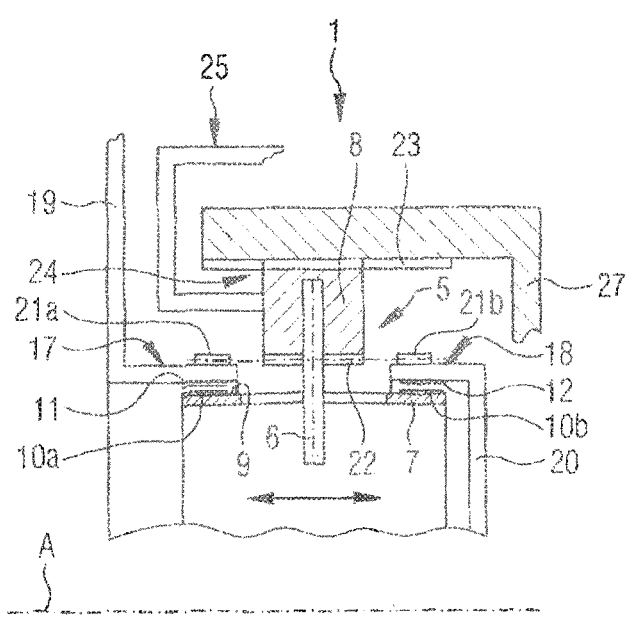
FIG. 2 shows another embodiment of the switching module.

Another exemplary embodiment of the switching module 1 is illustrated in FIG. 2. Output shaft 27 in this design is arranged on the end aligned toward switching unit 5 in the embodiment of a hollow shaft. Switching module 1 is accommodated inside this hollow shaft section. Actuating device 25 is arranged outside the hollow shaft section, whereby a precise depiction of actuating element 26 for control of the switching module 1 is not included.

Power transfer element 8 is in the form of a ring element and is coupled via a slide connection 24 with output shaft 27. The slide connection can be in the form of continuous gearing or another form fitting connection. A slide 6 is located in the center of power transfer element 8, so that on the drive side and output side, a section of the inside teeth 22 can engage during the movement with the outside teeth 21a, 21b of coupling components 19, 20.

In addition, synchronizer ring 7 can be coupled with slide 6 in such a manner that synchronization can be ensured. Such a coupling, as well as the special design of synchronizer ring 7 and slide 6 is known from the current state of the art, so that further explanations are not necessary.

In the illustrated neutral position, synchronizer ring 7 is located centrally between coupling components 19, 20 and friction surfaces 10a and 11, as well as 10b and 12 are located at a distance from one another so that no torque can be transferred. The friction surface planes are moreover arranged at a slight angle to axis A, so that during the movement, the friction surfaces are moved wedge-shaped relative to one another.

Figure 3:
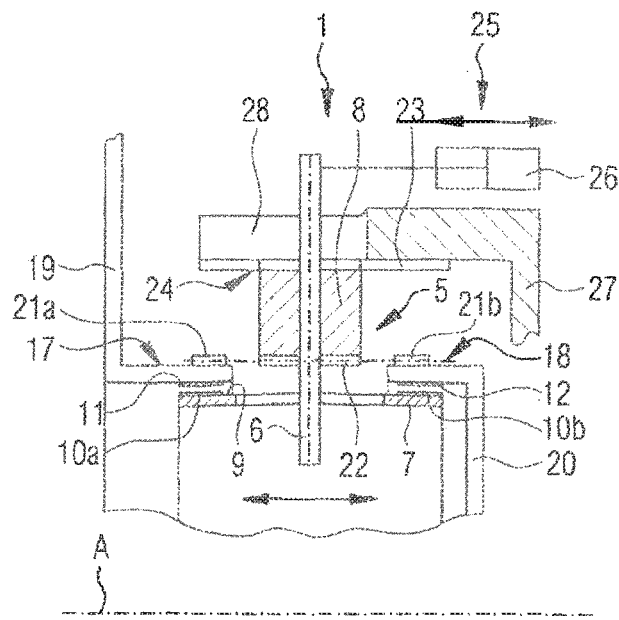
FIG. 3 shows another embodiment of the switching module.

FIG. 3 illustrates another exemplary embodiment of the switching module 1 which differs in that the actuation of the switching unit occurs via a cut-out in the output shaft. A section of slide 6, as illustrated, can protrude through the hollow shaft section of output shaft 27 onto which then the actuation element is directly coupled. Alternatively, several sections of slide 6, distributed over the circumference can protrude through cut-outs in the hollow shaft section and a number of actuating elements 26 may also be provided. Thus, canting during synchronization can be avoided.

Figure 4:
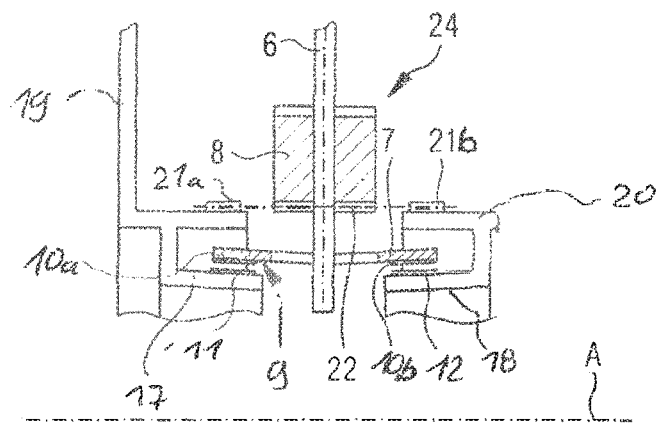
FIG. 4 shows an embodiment of the switching module with alternative arrangement of the friction surfaces.

FIG. 4 illustrates yet another exemplary embodiment of the friction surfaces relative to one another or respectively an alternative arrangement of synchronizer ring 7. Coupling components 19, 20 in this exemplary embodiment have additional cylindrical regions 17, 18 on which friction surfaces 11, 12 are located. The basic functioning during synchronization is identical in both designs, whereby in the arrangement according to FIGS. 1 to 3, the centrifugal force effective during rotation may lead to a reduction of the neutral gap between the friction surfaces and in the exemplary embodiment according to FIG. 4 may lead to an enlargement of the neutral gap between the friction surfaces.

Figure 5:
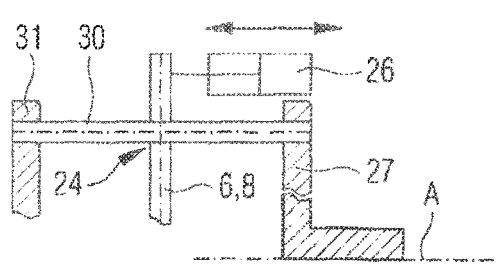
FIG. 5 shows an embodiment of a switching module with alternative slide connection.

FIG. 5 shows an exemplary embodiment of a slide connection for switching module 1.

In this exemplary embodiment guide rods 30 are provided over the circumference of output shaft 27 instead of the slide teeth 24. As shown, slide 6 can be moved along guide rods 30, where actuating device 26 is also coupled with slide 6. As shown, a ring 31 can be provided for stabilization of guide rods 30.

The design of actuating device 25 is to be considered symbolically in all illustrations. To avoid canting during movement, any number of pistons may also be distributed over the circumference, or a ring piston could be used.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

COMPONENT IDENTIFICATION LISTING

1 Switching module
2 Drive module
3 Output module
4 Automatic transmission/(housing)
5 Switching unit
6 Slide
7 Synchronizer ring
8 Power transfer element
9 Ring surface
10a,b Friction surface
11, 12 Counter friction surface
13 Planetary gear set
14 Hollow gear
15 Planetary carrier
16 Sun wheel
17, 18 cylindrical regions
19, 20 Coupling component
21a, b Outside teeth
22 Inside teeth
23 Inside teeth
24 Slide connection
25 Actuating device
26 Actuating element
27 Output shaft
28 Brake
29 Disk brake
30 Guide rods
31 Ring

What is claimed is:

1. A switching module for coupling a drive module to an output module in an automatic transmission whereby each are rotatably mounted around a common transmission axis, the switching module, comprising:
   a switching unit rotatably arranged about the common transmission axis and configured for coupling with at least one of the drive module and the output module in a movable and rotationally fixed manner, the switching unit further including:
      an element being configured for coupling the drive module and the output module with a force fit;
      a power transfer element being configured for coupling the drive module and the output module with a form fit, the power transfer element arranged radially outside of the element relative to the common transmission axis; and
      a slide interconnecting the power transmission element with the element.

2. The switching module according to claim 1, wherein the switching unit is coupled in a rotationally fixed manner with the output module.

3. The switching module according to claim 1, wherein the power transfer element is ring shaped and includes a plurality of inside teeth, wherein the power transfer element is coupled in a rotationally fixed manner with the output module via a slide connection arranged on an outside diameter of the power transfer element, and the element is a synchronizer ring with at least two friction surfaces.

4. The switching module according to claim 1, wherein the drive module includes a planetary gear set.

5. The switching module according to claim 4, wherein a ring gear of the planetary gear set is coupled with a first coupling part having a first counter friction surface and a planetary carrier of the planetary gear set is coupled with a second coupling part having a second counter friction surface.

6. The switching module according to claim 5, wherein the first coupling part includes a first circumference with a plurality of first teeth and the second coupling part having a second circumference with a plurality of second teeth, wherein an axial movement of the switching unit meshes a plurality of inside teeth on the power transfer element with the plurality of first teeth or the plurality of second teeth.

7. The switching module according to claim 5, wherein the first coupling part has a first ring shaped region having a first inner surface and a first outer surface, the second coupling part has a second ring shaped region having a second inner surface and a second outer surface, wherein a counter friction surface is arranged alternatively on the first inner surface and the second inner surface or the first outer surface and the second outer surface.

8. The switching module according to claim 1, wherein a synchronizer ring is coupled with the switching unit, wherein a movement of the switching unit engages the synchronizer ring with a plurality of internally or externally located counter friction surfaces.

9. The switching module according to claim 5, wherein the switching unit is movable into at least three positions, the at least three positions include a rotationally fixed first connection between the ring gear and the output module, a rotationally fixed second connection between the planetary carrier and the output module or a neutral position in which essentially no torque transfer occurs between a drive side and an output side.

10. The switching module according to claim 9, wherein an actuating device provides an axial movement of the switching unit.

11. The switching module according to claim 10, wherein the actuating device is actuated by an actuating element.

12. The switching module according to claim 11, wherein the actuating element is a pneumatic or hydraulic cylinder.

13. The switching module according to claim 1, wherein the output module includes a drive shaft and a slide connection arranged on the drive shaft.

14. The switching module according to claim 13, wherein the drive shaft includes at least one opening in a region of the slide connection, wherein the switching unit is movable over the at least one opening with an actuating device.

15. An automatic transmission, comprising:
a drive module including a planetary gear set having a ring gear and a planetary carrier;
an output module rotatably mounted about a common transmission axis with the drive module; and
a switching module selectively switchable between a first position, a second position and a neutral position, the first position having a first coupling between the ring gear and the output module, the second position having a second coupling between the planetary carrier and the output module and the neutral position in which essentially no torque transfer occurs between a drive side and an output side, the switching module including:
a switching unit rotatably arranged about the common transmission axis and configured for coupling with at least one of the drive module and the output module in a movable and rotationally fixed manner, the switching unit further including:
an element being configured for coupling the drive module and the output module with a force fit;
a power transfer element being configured for coupling the drive module and the output module with a form fit, the power transfer element arranged radially outside of the element relative to the common transmission axis; and
a slide interconnecting the power transmission element with the element.

* * * * *